United States Patent [19]

Delle Piane et al.

[11] Patent Number: 4,682,002

[45] Date of Patent: Jul. 21, 1987

[54] METHOD OF LASER WELDING SHEET METAL PROTECTED BY LOW-VAPORIZING-TEMPERATURE MATERIALS

[75] Inventors: Alberto Delle Piane, Bruino; Franco Sartorio, Turin; Maichi Cantello, Aglie' ; Guglielmo Ghiringhello, Quincinetto, all of Italy

[73] Assignee: Prima Progetti S.p.A., Turin, Italy

[21] Appl. No.: 666,726

[22] Filed: Oct. 31, 1984

[30] Foreign Application Priority Data

Sep. 20, 1984 [IT] Italy ................... 67940 A/84

[51] Int. Cl.⁴ .............................................. B23K 26/00
[52] U.S. Cl. ....................... 219/121 LD; 219/121 LC; 219/121 LM; 219/121 ED; 228/212
[58] Field of Search ................. 219/121 LC, 121 LD, 219/121 LM, 121 EC, 121 ED, 121 EM; 228/203, 212, 214, 44.1 R

[56] References Cited

U.S. PATENT DOCUMENTS

| 3,969,604 | 7/1976 | Baardsen | 219/121 LD |
| 4,237,363 | 12/1980 | Lemelson | 219/121 PD |
| 4,386,728 | 7/1983 | Torok et al. | 219/121 LD |

FOREIGN PATENT DOCUMENTS 0593757  12/1977  Switzerland ................ 219/121 LD Primary Examiner—M. H. Paschall
Attorney, Agent, or Firm—Jeffers, Irish & Hoffman

[57] ABSTRACT

Method of laser welding sheet metal protected by using low-vaporizing-temperature materials, whereby, before being subjected to a laser welding beam along a weld area, two metal sheets are placed on top of each other in such a manner that at least one layer of the said protecting material is located between the sheets at the weld area and that the weld area communicates directly externally of the weld area between the sheets whereby gases generated by vaporization of said protective material may escape from the weld area.

10 Claims, 7 Drawing Figures

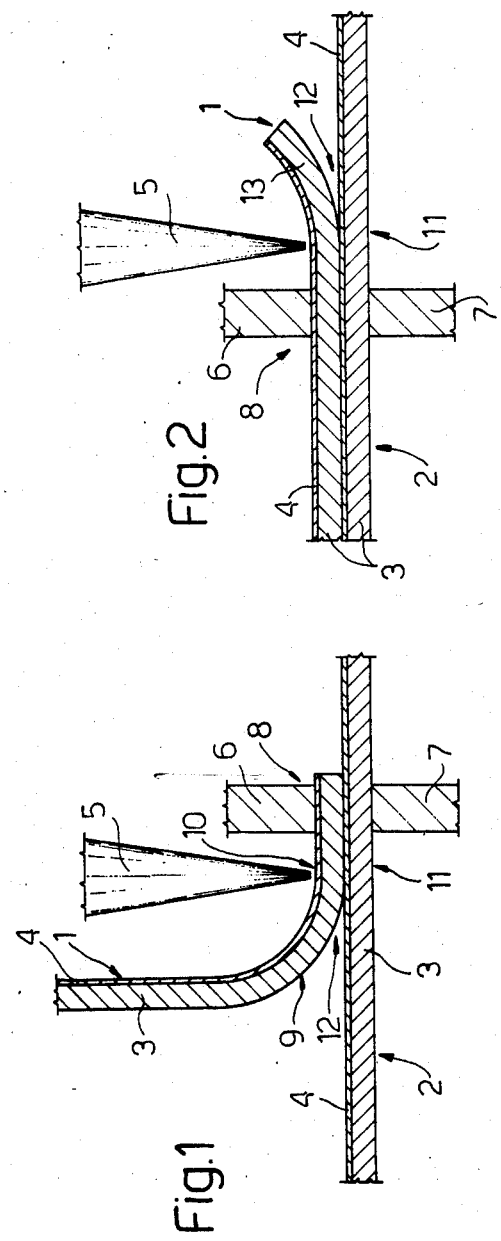

METHOD OF LASER WELDING SHEET METAL PROTECTED BY LOW-VAPORIZING-TEMPERATURE MATERIALS

BACKGROUND OF THE INVENTION

The present invention relates to a method of laser welding sheet metal. In particular, the sheet steel to which the ensuing description applies solely by way of a non-limiting example, is protected by a layer of low-vaporizing-temperature materials.

As of the present, laser beam machines are known to be employed, not only for cutting flat or otherwise drawn sheet metal along given cutting lines, but also for spot or seam welding sheets together.

According to general practice, two steel sheets for laser welding are held together contacting each other as tightly as possible along the entire weld area by means of grips, so as to ensure, among other things, perfect thermal conduction between the sheets. The latter are then subjected to a laser beam which welds the sheets together by smelting the metal in the weld area swept by the said beam.

Whereas the aforementioned method has proved particularly effective for welding bare sheet steel, i.e. having no covering material protecting it against external agents, it proves inadequate when welding together metal sheets protected against external agents by using a layer of coating of low-vaporizing-temperature materials.

At this point, it should be specified that the term "low-vaporizing-temperature material" is intended to mean material, such as zinc, having a melting and vaporizing temperature considerably below that of iron.

If two thus protected metal sheets using a material such as zinc or a similar material are welded together using the same technique employed for welding bare sheet, the resulting welds invariably prove uneven and riddled with craters, faults which, regardless of whether or not the weld is endangered, involve high-cost follow-up machining for their removal, particularly when, as often occurs in the car industry where the use of zinc-plated sheet is practically universal, the said welds extend over visible parts.

SUMMARY OF THE INVENTION

The aim of the present invention is to provide a method of laser welding protected sheet metal, the said method providing for welds essentially free from craters or similar imperfections.

With this aim in view, the present invention relates to a method of laser welding sheet metal which is protected by using low-vaporizing-temperature materials, whereby at least two metal sheets, at least one of which is protected, are placed one on top of the other in the weld area, at least one layer of the said protecting material being located between the metal sheets in the said weld area, characterised by the fact that, before sweeping the said weld area with a laser beam emitted by a laser welding machine, the said two sheets are clamped essentially contacting each other and in such a manner as to ensure essentially external communication of the said protective layer in the said weld area.

A suprising discovery is that the tighter two protected metal sheets are clamped together over the weld area for optimizing thermal conduction between the same, the greater is the number of craters formed and the poorer the quality of the resulting weld. And neither is the latter problem improved by reducing clamping pressure. The only improvement in welding quality is achieved when, on account of the location of the weld area on the sheets, the manner in which the latter are clamped together and the shape of the sheets themselves, essentially external communication is assured of the protective layer between the sheets in the weld area.

The conclusion reached, in view of this suprising discovery, is that the craters formed in the weld area are not, as originally thought, caused by the intrinsic nature of protected metal sheet, but rather by the protective material between the metal sheets boiling, in gaseous form, through the molten metal on the sheets, so as to form microexplosions, and that the resulting craters can only be eliminated by allowing the said gas to be blown off externally without passing through the molten metal on the sheet.

BRIEF DESCRIPTION OF THE DRAWINGS

A number of non-limiting arrangements of the present invention will now be described with reference to the attached drawings in which:

FIG. 1 shows a first technique for welding protected sheet metal according to the present invention;

FIG. 2 shows a variation of the FIG. 1 technique;

FIGS. 3 and 4 show two variations of a further welding technique according to the present invention;

DETAILED DESCRIPTION OF THE INVENTION

Figure 7:
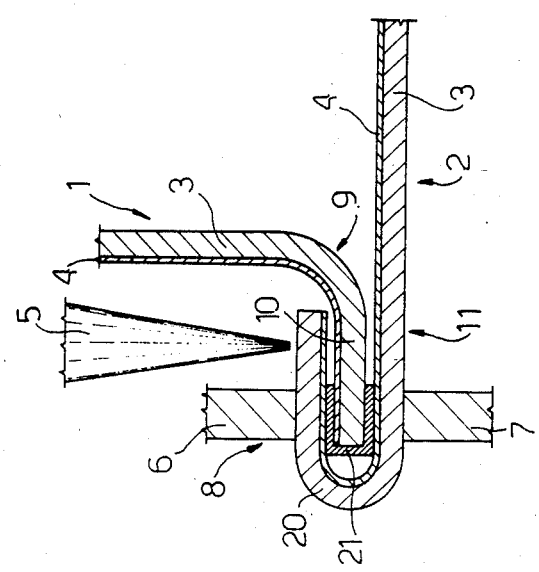
FIG. 7 shows yet another technique for welding protected sheet metal according to the present invention.

In all the attached drawings, numbers 1 and 2 indicate two metal sheets, the first arranged on top of the second and each comprising a layer of metal 3 and a protective layer 4 of low-vaporizing-temperature material, such as zinc.

Though, in the attached drawings, sheets 1 and 2 are shown as being separate, needless to say, they may also consist of a single sheet bent to form a U. Furthermore, whereas, in the attached drawings, sheet 1 and 2 are each provided with a single protective layer 4, clearly, the ensuing description would in no way be affected if, as is usually the case in actual practice, sheets 1 and 2 were each provided with two opposed protective layers 4. Finally, whereas, in all the attached drawings, a single protective layer 4, i.e. that of sheet 2, is located between sheets 1 and 2, the ensuing description would obviously in no way be affected if the protective layers 4 of both sheets 1 and 2 were located facing each other between the said metal sheets.

In all the attached drawings, number 5 indicates an output head on a laser welding machine and numbers 6 and 7 the jaws of a grip 8 for clamping together sheets 1 and 2.

As shown in the FIG. 1 example, sheet 1 comprises a curved section 9 blending with a flat section 10 to be welded to the upper surface of sheet 2 protected by layer 4. For welding the sheets on the said welding machine, the flat section 10 of sheet 1 is arranged contacting sheet 2 and clamped to the latter by means of a single grip 8 located a given distance from the curved section 9. Subsequently, the head 5 on the welding machine is arranged facing the free surface of sheet 1 in the space between grip 8 and curved section 9, so as to weld area 11 on flat section 10 as close as possible to the end of the latter blending with curved section 9. In like manner, a side edge of weld area 11 communicates essentially externally through space 12 between protective layer 4 on sheet 2 and curved section 9 on sheet 1.

When the welding machine is started up, the heat released by the laser beam emitted by head 5 smelts almost instantly the metal of sheets 1 and 2 located essentially in area 11, while at the same time vaporizing the material constituting the portion of layer 4 on sheet 2 located in and around area 11. Despite the low resistance of the molten metal of sheets 1 and 2 to the gas produced by the vaporization of the material of layer 4, the said gas is blown straight out through the lesser-resisting passage consisting of space 12.

The main outcome of this is that the resulting weld is essentially free of imperfections, especially the craters that would have been formed in area 11 and on the outer surface of sheets 1 and 2, had the gas, produced by protective layer 4 vaporizing, blown through the molten metal on the said sheets.

In the FIG. 2 example, one end of a flat sheet 1 is welded on to sheet 2. Before welding, the free edge of sheet 1 close to weld area 11 is bent slightly so as to form a lip 13 bending away from sheet 2 so as to define with it a space 12 enabling the gas produced by the vaporization of layer 4 to escape. In this case, grip 8 is arranged on the opposite side of weld area 11 in relation to lip 13 so as to essentially reproduce the same situation described with reference to FIG. 1.

In both FIGS. 1 and 2 examples, clamping of sheets 1 and 2 is unilateral, i.e. on one side of weld area 11, whereas, in FIG. 3 example, clamping may be one- or two-sided as required.

FIG. 3 shows the laser welding of two flat sheets 1 and 2 which may be clamped by a single grip 8 (shown by a solid line in FIG. 3) on one side of a weld area 11, or by the said grip 8 and a second grip 8 (shown by the dotted line) on the opposite side to the first grip 8 in relation to weld area 11.

In the case of the FIG. 3 example, the employment of a second grip 8 is made possible by a channel 14 located between sheets 1 and 2, communicating externally and extending over the entire weld area 11. Channel 14, which is obviously relatively shallow (about 0.1 mm for steel sheets 1 and 2), is nevertheless sufficient to allow the gas produced by the vaporization of layer 4 to be blown out and is formed by bending sheet 1 (or 2 or both).

FIG. 4 shows an arrangement essentially similar to that of FIG. 3, whereby the said channel for exhausting the gas produced by the vaporization of layer 4 is broken up into a number of separate channels forming a knurled section 15 on the inner surface of sheet 1 (or 2 or both).

Figure 5:
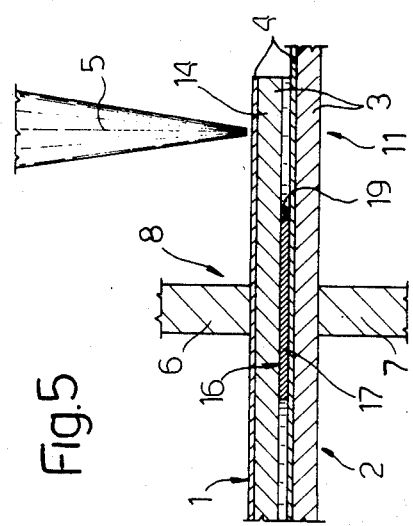
FIG. 5 shows yet another welding techinque according to the present invention.
Figure 6:
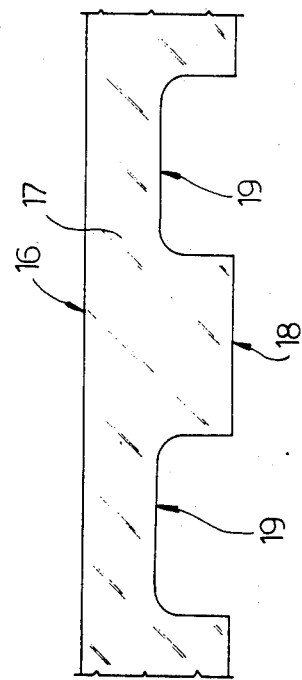
FIG. 6 shows a plan view of a FIG. 5 detail.

The example in FIGS. 5 and 6 shows the laser welding of two sheets along a side edge of at least one of them. In the example shown, sheet 1 is welded along one of its side edges to sheet 2.

In the FIGS. 5 and 6 example, sheets 1 and 2 are welded in a number of areas 11 and channels 14 for exhausting from the said areas the gas produced by the vaporization of layer 4 are defined by a spacer 16 inserted between sheets 1 and 2 along weld areas 11. As shown in more detail in FIG. 6, spacer 16 comes in the shape of a flat strip 17 along a side edge 18 of which provision is made for recesses 19 arranged to conform with weld areas 11.

As shown in FIG. 5, spacer 16 is arranged between sheets 1 and 2 in such a manner that its edge 18 essentially coincides with the said side edge on the sheet 1, and recesses 19 coincide with weld areas 11. In like manner, each recess 19 defines a respective channel for blowing out the said vaporizing gas.

In a variation not shown, recesses 19 are replaced by a knurled section, preferably crosswise, similar to the knurled section 15 in FIG. 4 and formed on one or both faces of spacer 16.

The FIG. 7 example shows the laser welding of two sheets, 1 and 2, of which sheet 2 presents a side portion 20 bent to form a U round a side edge of sheet 1. In the example shown, sheet 1 is bent so as to comprise a curved section 9 blending with a flat section 10 as on sheet 1 in FIG. 1. The said flat section 10 is inserted inside the curved portion 20 of sheet 2 with a spacer 21 inbetween, the latter having an essentially U-shaped section and fitting on to the free side edge of flat section 10.

In the FIG. 7 example, sheets 1 and 2 are welded by clamping them together using grip 8, the jaws 6 and 7 of which are arranged over space 21, and by locating head 5 between grip 8 and curved section 9 on sheet 1.

Clearly, the welding technique described with reference to FIG. 7 may be used, with obvious modifications, for welding three sheets arranged one on top of the other. With reference to FIGS. 5 and 7, it should be pointed out that spacers 17 and 21 may even be dispensed with. In fact, instead of grip jaws, parts 6 and 7 could be supporting elements, e.g. magnetic or vacuum-operated, fitted on to the weld sheets in such a manner as to ensure a given mutual position with at least one passage inbetween for exhausting vaporization gas.

Obviously, the examples described with reference to the attached drawings are only a few of the techniques available for welding together, on a laser welding machine, two, three or even more metal sheets protected using low-vaporizing-temperature materials.

In this connection, however, it should be pointed out that, however the welding operation is performed, the metal sheets, contrary to what one would logically suppose, must not be clamped together airtight over the welding area. In fact, the only way of obtaining a "clean" weld between two metal sheets protected by using low-vaporizing-temperature materials is to provide between the metal sheets, in any way possible, a passage enabling the weld area to communicate externally, where "externally" is intended to mean any space enabling safe expansion of the said vaporizing gas. Obviously, the hydraulic resistance of the said exhaust passage to the said vaporizing gas must be lower than that of the molten metal on the sheets being welded.

What is claimed is:

1. A method of laser welding a plurality of metal sheets, at least one of said sheets being protected by a layer of low-vaporizing-temperature material, the method comprising:

orienting said sheet in facing relationship in the weld area, said layer of protective material being located between said two metal sheets in the weld area;

supporting said sheets so that the facing opposed surfaces thereof are in relatively loose contact in the weld area to permit the escape of gases from between said sheets in the weld area;

providing a low resistance path substantially parallel to and along at least a substantial part of the weld area for the escape of gases generated by the vaporization of said layer of protective material between said sheets in the weld area; and sweeping the weld area with a laser beam emitted by a laser welding machine.

2. The method according to claim 1, characterised by the fact that the said plurality of sheets comprises two sheets (1, 2), said two sheets being oriented in overlapped relationship, said sheets being supported by supporting means (8) adjacent to the said weld area (11) and extending along only one side of the weld area; the said layer (4) of protecting material between the said overlapping sheets on the other side of the weld area communicating with a space externally of the weld area along at least a substantial part of the weld area.

3. The method according to claim 2, characterised by the fact that the said supporting means (8) comprises gripping means for clamping the said sheets (1, 2) together.

4. The method according to claim 2, characterised by the fact that the said supporting means (8) comprises holding means (1, 2) for securing said sheets in a given relative orientation with respect to each other.

5. The method according to claim 2, characterised by the fact that the said weld area (11) extends along portions of the said two sheets (1, 2) having given, substantially identical contours; at least one (10) of the said portions of a first of said two sheets (1) blending with at least one further portion (9) of said first sheet having a different contour from a facing opposed portion of the other said sheet (2) and diverging from said facing opposed portion; the said supporting means (8) being located between the said weld area (11) and the said diverging portion (9).

6. The method according to claim 1, characterised by the fact that the said layer (4) of protective material communicates externally of the weld area between the said facing sheets through at least one passage which extends along a substantial part of the weld area (11) between the said sheets (1, 2) and which leads from the said weld area (11) to the space outside said weld area to enable safe expansion of the vaporizing gas.

7. The method according to claim 6, characterised by the fact that the said passage consists of at least one channel (14) formed substantially along the entire weld area between the said sheets (1, 2) by distortion of at least one of said sheets (1, 2).

8. The method according to claim 6, characterised by the fact that the said passage consists of a number of channels formed in the weld area between the said sheets (1, 2) by forming a knurled section (15) on the surface of at least one of the said sheets (1, 2) which faces the other of said sheets.

9. The method according to claim 6, characterised by the fact that the said passage is formed by inserting spacing means (16) between the said sheets (1 ,2) adjacent to the said weld area (11).

10. The method according to claim 4, characterised by the fact that the said passage is formed by maintaining a given clearance between the said sheets (1, 2) using the said holding means.

* * * * *

UNITED STATES PATENT AND TRADEMARK OFFICE
CERTIFICATE OF CORRECTION

PATENT NO.  : 4,682,002
DATED       : July 21, 1987
INVENTOR(S) : Alberto Delle Piane et al It is certified that error appears in the above-identified patent and that said Letters Patent is hereby corrected as shown below:

```
Col. 1, line 65, change "suprising" to --surprising--;
Col. 2, line 30, change "techinque" to --technique--;
Claim 4, Col. 5, line 24, delete "(1,2)".
```

Signed and Sealed this

Eighth Day of December, 1987

Attest:

DONALD J. QUIGG

Attesting Officer

Commissioner of Patents and Trademarks